United States Patent
Lisi

[19]

[11] Patent Number: 6,041,977
[45] Date of Patent: Mar. 28, 2000

[54] DISPENSING SYSTEM FOR DECORATING OR FILLING EDIBLE PRODUCTS

[76] Inventor: Edmund T. Lisi, 14825 N. 50th St., Scottsdale, Ariz. 85254

[21] Appl. No.: 09/121,484

[22] Filed: Jul. 23, 1998

[51] Int. Cl.[7] ........................................... B67D 5/42
[52] U.S. Cl. ........................... 222/389; 222/179; 222/575
[58] Field of Search ................................... 222/179, 389, 222/396, 397, 395

[56] References Cited

U.S. PATENT DOCUMENTS

| | | |
|---|---|---|
| 1,632,559 | 6/1927 | Pedrick . |
| 1,731,767 | 10/1929 | Cramer .................... 222/389 |
| 2,113,333 | 4/1938 | Piquerez .................... 221/47 |
| 2,615,598 | 10/1952 | Watkins et al. ............. 222/389 X |
| 2,731,297 | 1/1956 | Meyer ...................... 222/389 X |
| 2,738,227 | 3/1956 | Havens ..................... 222/389 X |
| 2,751,124 | 6/1956 | Jones ....................... 222/179 |
| 3,197,081 | 7/1965 | Midworth ................... 222/179 |
| 3,272,393 | 9/1966 | Roeser ...................... 222/389 X |
| 3,279,422 | 10/1966 | Landers ..................... 118/2 |
| 3,343,505 | 9/1967 | Lathey et al. ............... 107/29 |
| 3,450,069 | 6/1969 | Santa Cruz .................. 107/4 |
| 3,536,034 | 10/1970 | Lecrone ..................... 118/16 |
| 3,651,994 | 3/1972 | Nordenholt .................. 222/160 |
| 3,751,198 | 8/1973 | Tanara ....................... 425/100 |
| 3,921,858 | 11/1975 | Bemm ....................... 222/389 X |
| 4,231,494 | 11/1980 | Greenwood .................. 222/179 X |
| 4,273,270 | 6/1981 | Kray ........................ 222/396 X |
| 4,634,027 | 1/1987 | Kanarvogel ................. 222/389 X |
| 4,635,827 | 1/1987 | Roedig ...................... 222/389 X |
| 4,676,410 | 6/1987 | Flue ......................... 222/327 |
| 4,910,661 | 3/1990 | Barth et al. ................. 364/167 |
| 5,002,203 | 3/1991 | Einer ........................ 222/95 |
| 5,029,731 | 7/1991 | Klatt ........................ 222/54 |
| 5,041,094 | 8/1991 | Perego ...................... 604/143 |
| 5,435,466 | 7/1995 | Due ......................... 222/108 |
| 5,505,775 | 4/1996 | Kitos ........................ 118/14 |
| 5,816,450 | 10/1998 | Alexander et al. ............ 222/179 |
| 5,887,764 | 3/1999 | Ennis, III et al. ............ 222/389 |

*Primary Examiner*—Gregory L. Huson
*Attorney, Agent, or Firm*—Cahill, Sutton & Thomas P.L.C.

[57] ABSTRACT

A dispensing system for dispensing decorating materials such as frosting incorporates a dispensing tube having the material to be dispensed and a water-operated piston therein. Application of water under pressure to the dispensing tube results in the dispensing of the material through a decorating tip. The water pressure applied to the dispensing tube is controlled and regulated through the utilization of a control valve assembly having a flow stop valve and an on/off valve. Water applied to the control valve assembly is pressure regulated and filtered.

14 Claims, 4 Drawing Sheets

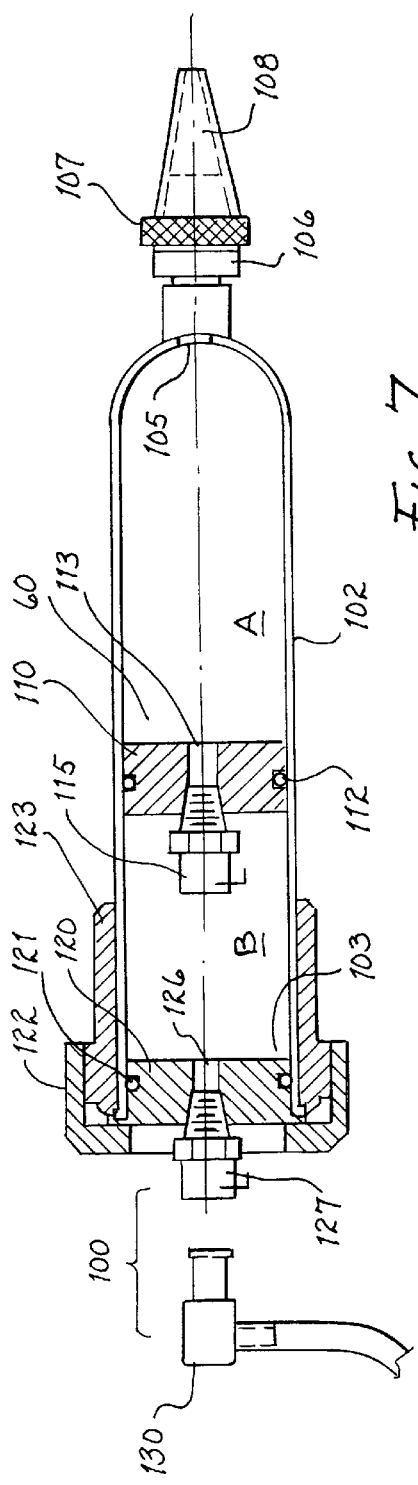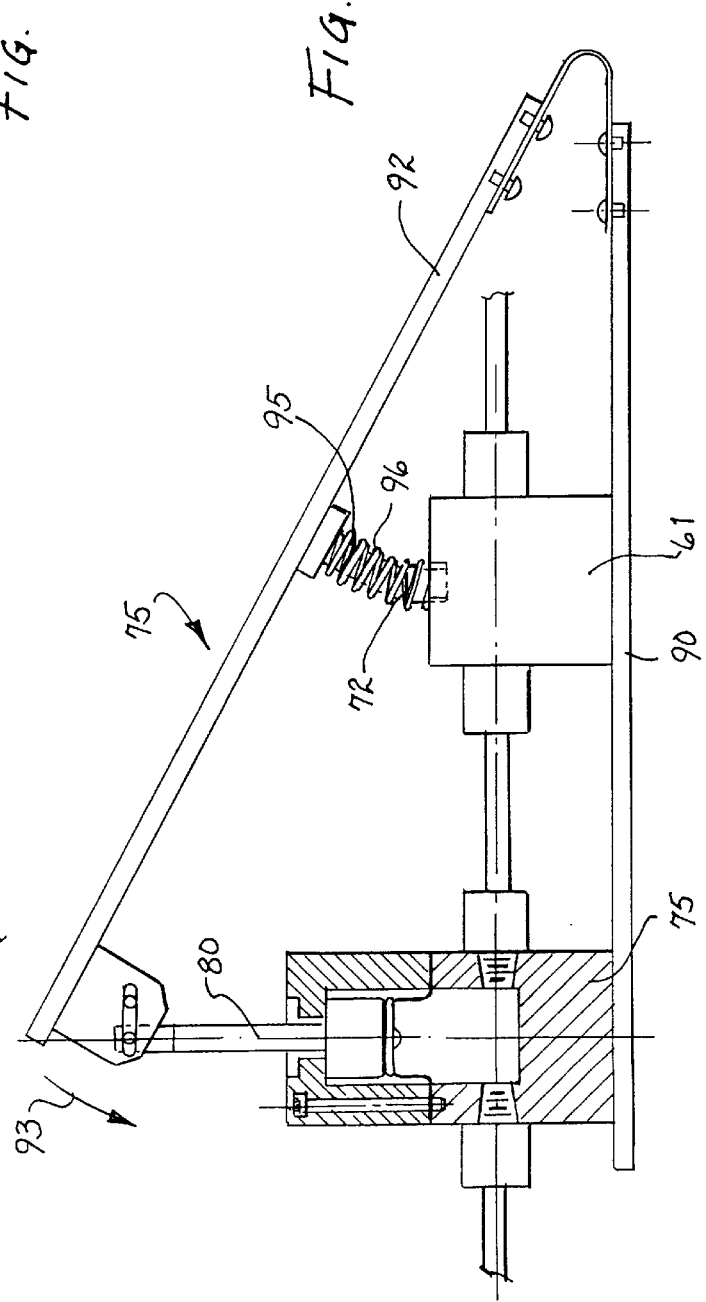
FIG. 7
FIG. 8

6,041,977

DISPENSING SYSTEM FOR DECORATING OR FILLING EDIBLE PRODUCTS

FIELD OF THE INVENTION

The present invention pertains to dispensing systems, and more specifically to dispensing systems for dispensing viscous materials such as fillings, frostings and icings for use on edible products such as cakes, cookies, pastries and the like.

BACKGROUND OF THE INVENTION

Pastry chefs conventionally utilize a pastry bag containing the frosting that they are applying to a cake, cookie, pastry or other edible item. In larger bakeries where chefs are preparing large numbers of such deserts requiring frostings and decorated frosting designs, the prior art has suggested the utilization of centralized frosting dispenser pumps wherein the frosting materials are forced through tubes to a hand-held dispenser so that the frostings are applied by one or more chefs, simultaneously, to the pastries through the tubes. Since such frostings typically exhibit a relatively high viscosity, the pressures within the tubing are high; further, the frosting must be the same for each of the "chefs" as they apply the frosting to the bakery product. If the pastry designs require more than one frosting (i.e., different colors or different materials), the centralized frosting dispensing system becomes too cumbersome since the entire system must be flushed before receiving the second frosting color or flavor.

The above prior art difficulties are equally applicable to a system designed for a single decorating chef. Changing the flavors of frostings or the color of frostings becomes much too cumbersome to rely upon such dispensing system. The decorating chefs then usually rely upon older and conventional techniques such as the use of pastry bags. The use of pastry bags requires the decorating chef to use both hands, one to maintain closure of the bag and both hands to apply the pressure to the bag to force the contents from the bag onto the item being decorated; both hands must follow the design pattern being implemented by the chef. This technique, while time tested in conventional cake decorating, is fatiguing and can be time consuming if the chef is to decorate large numbers of items.

OBJECTS OF THE INVENTION

It is therefore an object of the present invention to provide a dispensing system to permit the dispensing of viscous materials such as cake frostings and fillings in an economical and convenient manner.

It is also an object of the present invention to provide a dispensing system to permit the use of various fillings, frostings or decorating materials without the need to clean or flush the system between the use of the different materials.

It is still another object of the present invention to provide a dispensing system that can provide a means for dispensing viscous materials such as frostings simultaneously by a plurality of chefs while permitting each chef to change the dispensing material at his location without affecting the operation of the dispensing system at the remaining chefs' positions.

It is still another object of the present invention to provide a convenient and economical dispensing system to permit a pastry chef to fill or decorate pastries and the like with one or more dispensing frostings or materials by conveniently using a single hand to perform the decorating movements.

These and other objects of the present invention will become apparent to those skilled in the art as the description thereof proceeds.

SUMMARY OF THE INVENTION

The present invention overcomes the problems exhibited by the prior art by utilizing a centralized water pressure system that delivers water under a regulated suitable pressure through tubes to individual chef's stations. Each chef is provided with a foot-operated valve to permit the pressurized water to be admitted to a hand-held frosting dispenser. The dispenser comprises a cylindrical tube filled with the desired frosting or filling which is forced out of a dispenser decorating tip, secured to the cylindrical tube, by a piston within the dispenser. The piston is driven by the water pressure connected to the dispenser. This dispenser/tube connection is a quick disconnect connection so that the chef may use one color frosting to complete part of a design and then simply disconnect the dispenser and connect a second dispenser with a different color frosting therein. The dispenser is operated by the above mentioned foot-operated valve to admit pressurized water to the piston within the connected dispenser.

Using this novel frosting dispensing system, several cake decorators may work in a room each having a pressurized water tube at their station with a foot-operated valve to apply the water pressure to their respective dispenser which will then force the piston within the dispenser cylinder against the frosting to dispense the latter through the frosting decorating tip. When different colors are required by the frosting design, the operator merely needs to disconnect the dispenser at the quick disconnect and reconnect the dispenser with a different frosting color. This operation takes place without interfering with or affecting the operation of the other decorator chefs.

BRIEF DESCRIPTION OF THE DRAWINGS

The present invention may more readily be described by reference to the accompanying drawings in which:

FIG. 7 is a cross-sectional view of the dispensing tube, partly in section, of the dispensing system of the present invention.

FIG. 8 is an enlarged view of the control valve assembly of FIG. 3.

DETAILED DESCRIPTION OF THE PREFERRED EMBODIMENT

Figure 1:
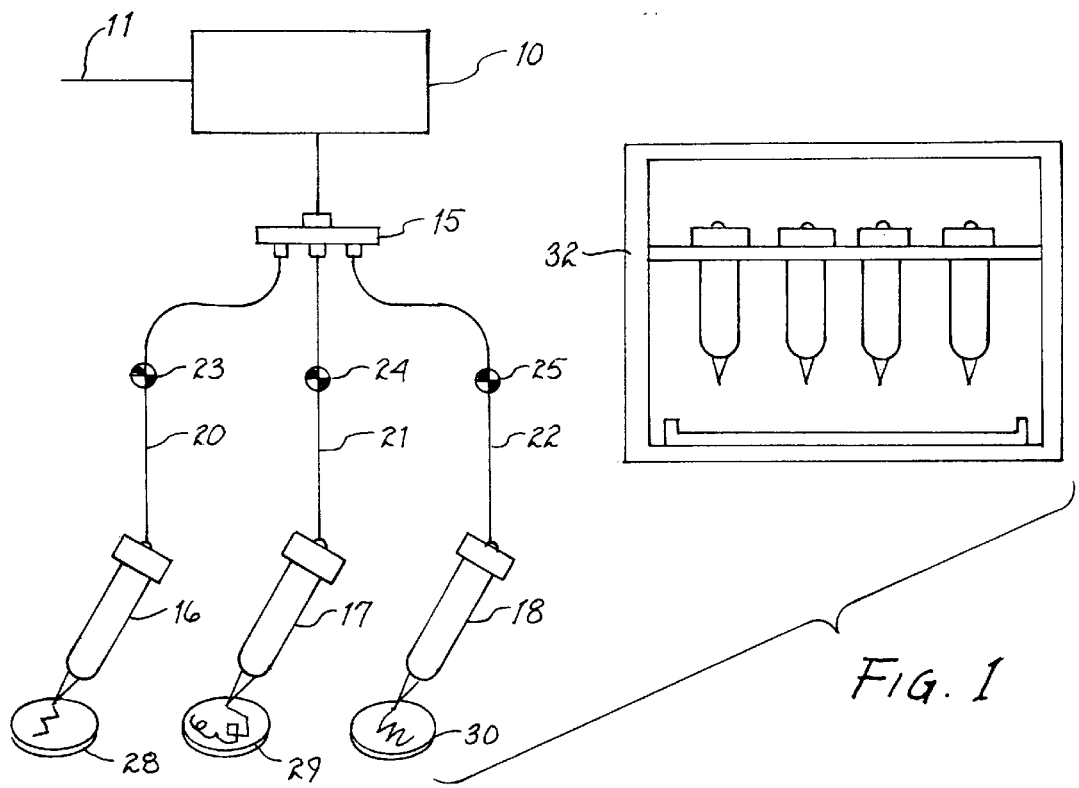
FIG. 1 is a schematic representation of a dispensing system incorporating the teachings of the present invention.

Referring to FIG. 1, a schematic representation of a dispensing system constructed in accordance with the teachings of the present invention is shown. A water supply cabinet 10 is connected to a convenient source of water such as a conventional city water supply line 11. The water pressure is regulated and the water is filtered within the supply cabinet and the output from the water supply cabinet is applied to a distribution manifold 15 to provide distribution to a plurality of dispensing tubes 16–18. Each of the dispensing tubes 16–18 is connected by a flexible tube 20, 21 and 22, respectively, to a corresponding control valve assembly 23, 24 and 25 to permit the operator to control the water pressure applied to the respective dispensing tube. The decorating material within each of the dispensing tubes is forced out of the tubes onto a workpiece such as a cake, cookie, or other pastry shown schematically in FIG. 1 at 28, 29 and 30. Each dispensing tube may be held in one hand to facilitate the decorating process by each of the decorating chefs. Each chef may therefore operate independently of the remaining chefs and may conveniently terminate the application of decorating material to a workpiece, disconnect the corresponding dispensing tube through the use of a quick disconnect coupling and avail themselves of a second (or third, fourth . . . ) dispensing tube having a different color material or a different material. The chef would then connect that dispensing tube at his station to thereafter operate the corresponding control valve assembly and continue his decorating process. This operation is independent of the operation of the remaining chefs; further, these supplemental dispensing tubes (shown in FIG. 1 schematically as a rack 32 of such tubes) may conveniently be kept at hand containing a variety of colors and materials to accommodate the pastry chef's design intentions for the respective workpiece.

Figure 2:
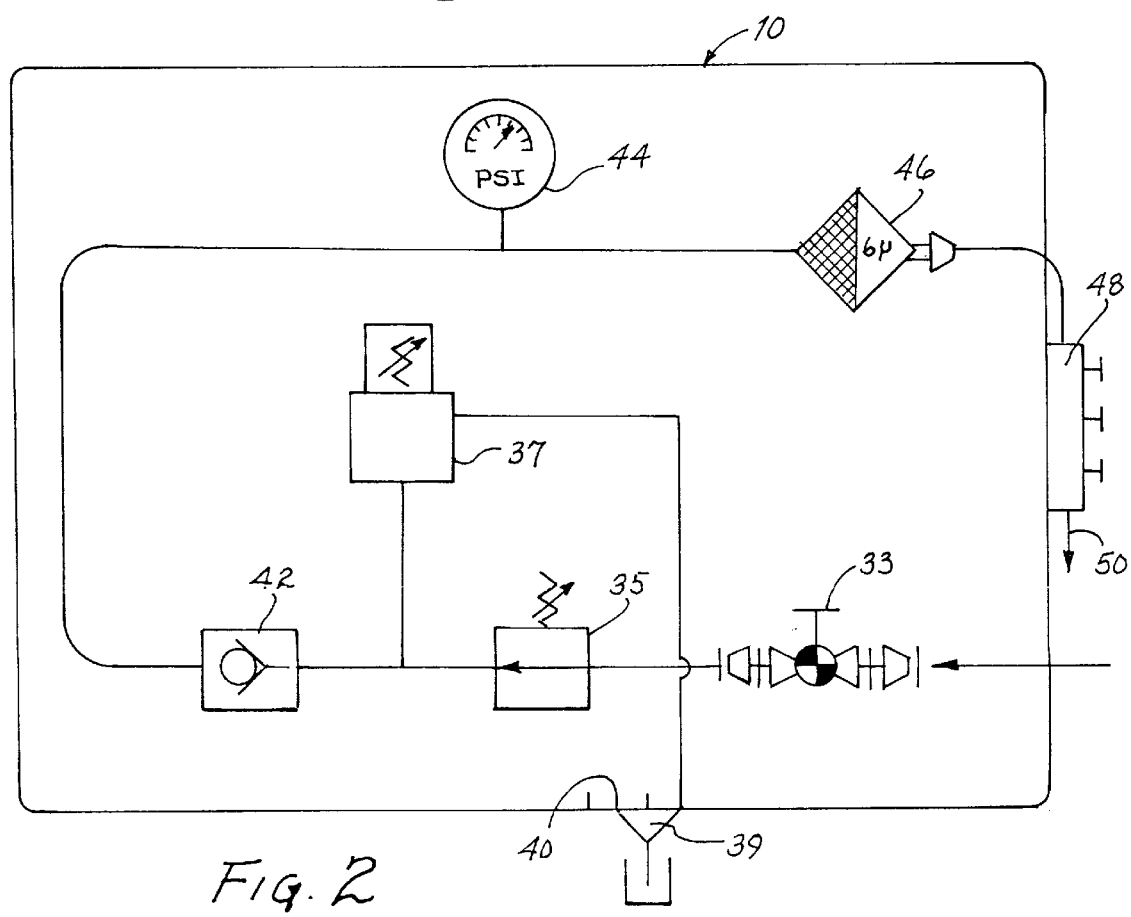
FIG. 2 is a schematic drawing of the water supply cabinet incorporated in the system of the present invention.

Referring now to FIG. 2, a schematic representation of the water supply cabinet 10 utilized in the system of the present invention is shown. The water supply cabinet provides an on/off valve 33 for connection to a conventional water supply. This water supply may be conventional tap water supply or may be a water supply from a storage tank or from a pressurized water supply provided through the utilization of a water pump. It has been found that the utilization of a water supply having water that has been chlorinated is advantageous. In those instances where the dispensing system of the present invention is to be unused for an extended period of time, the chlorination of the water has the beneficial effect of preventing the accumulation of algae in the tubes within the system of the present invention. Water sources that are not chlorinated may present a problem if the system is not regularly flushed and cleaned at frequent intervals. Typically, tap water pressures of 40 to 80 psig are available; the water from the supply valve is applied to a water pressure regulator 35 to reduce the pressure from the supply line pressure to a range of 15 to 25 psig or lower. The water pressure regulator 35 is a conventional off-the-shelf purchased item manufactured of PVC material and is available through numerous supply sources. A pressure relief valve 37 is also provided and is positioned to provide excessive pressure relief by directing water to a relief drain 39 when the pressure exceeds a predetermined value. The relief drain 39 also provides a means for draining the water supply cabinet in the event water escapes into the cabinet; an opening 40 in the bottom of the cabinet permits accumulated water within the cabinet to drain.

A back flow prevention valve 42 prevents back flow of water in the system in the event of pressure loss in the supply. The back flow prevention valve 42 and the pressure relief valve 37 are conventional off-the-shelf items readily available and may be obtained through numerous suppliers in a manner similar to the water pressure regulator described above. A pressure gauge 44 is provided in the line leading from the back flow prevention valve to a six micron filter 46 to filter out fine particles and contaminants. The elimination of particles in excess of the filtered value reduces elastomer seal wear and also extends plastic component life such as dispensing tubes and fittings. Water from the filter 46 is applied to a system maintenance manifold 48 that may be used for diagnostic purposes or for system cleaning. The maintenance manifold 48 may not be necessary to the operation of the system of the present invention, but has been found to be a convenient accessory to facilitate cleaning and maintenance of the system. A service line 50 connected to the system maintenance manifold provides the water under appropriate working pressure to a distribution manifold (to be described) which in turn may be connected through control valve assemblies to dispensing tubes.

Figure 3:
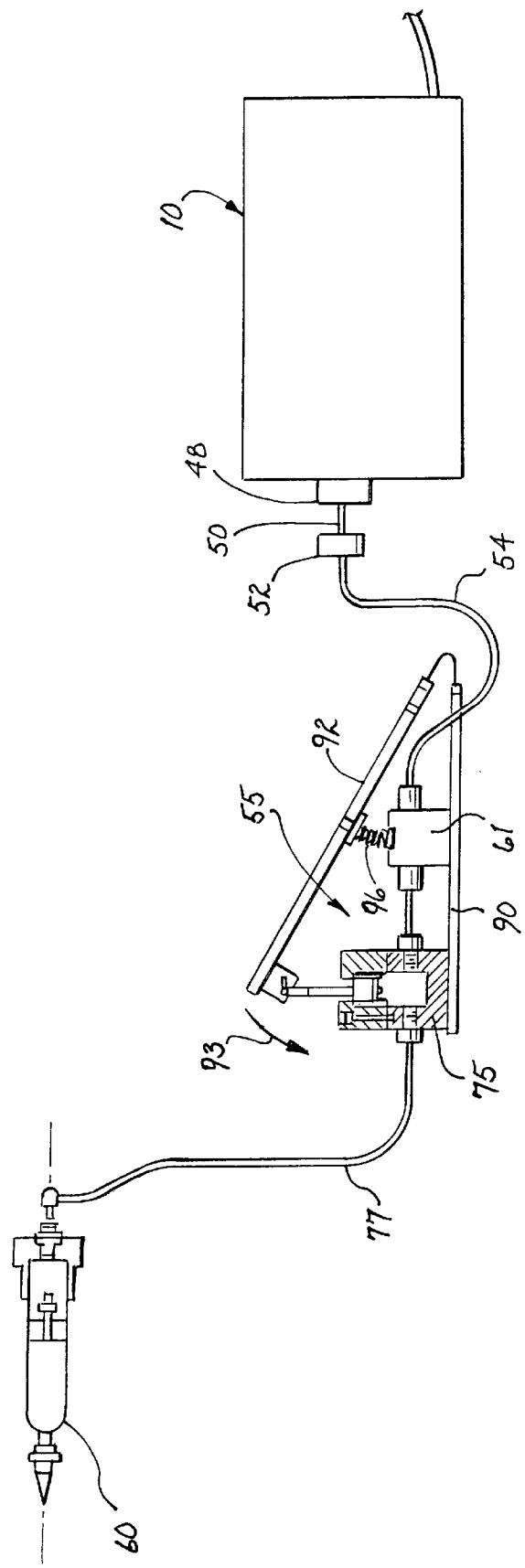
FIG. 3 shows some of the elements of the dispensing system of the present invention including a dispensing tube connected to a control valve assembly which in turn is connected to the water supply cabinet. The control valve assembly is shown partly in section.
Figure 6:
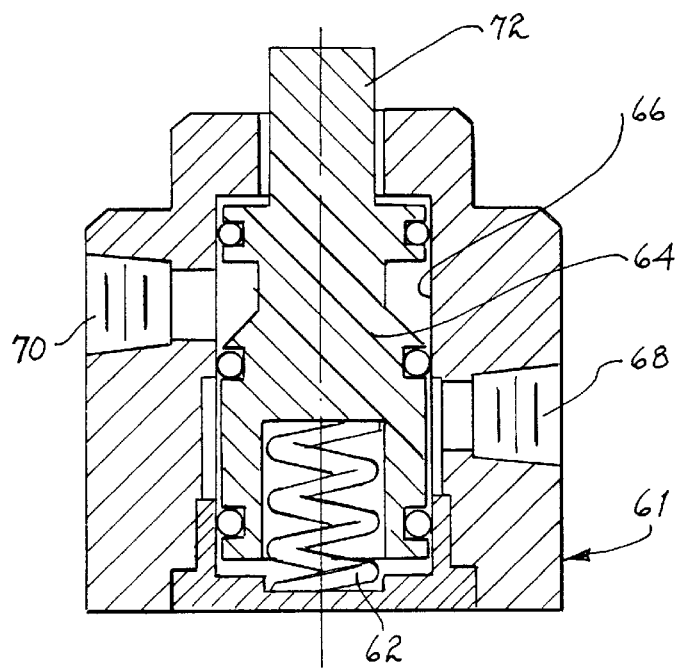
FIG. 6 is a cross-sectional view of the on/off valve of the control valve assembly of FIG. 3.

Referring now to FIG. 3, the water supply cabinet 10 is shown providing filtered water under suitable pressure to the system maintenance manifold 48 which in turn provides such water through a service line 50 to the distribution manifold 52. The distribution manifold 52 is connected through flexible tubing 54 to a control valve assembly 55; the pressurized water is applied through the control valve assembly 55 to a dispensing tube 60. The control valve assembly is shown enlarged in FIG. 8. The control valve assembly 55 provides an on/off valve 61 that is spring loaded to a normally closed position. A cross-sectional view of such on/off valve 61 is shown in FIG. 6 wherein it may be seen that a closure spring 62 is provided that urges a piston 64 contained within a cylindrical passageway 66 within the valve to a closed position. At this position, the input 68 and output 70 openings are blocked. Pressure applied to the operating rod 72 in opposition to the force of the closure spring 62 moves the piston 64 away from its normally closed position to open the passageway and permit passage of the pressurized water through the valve. Returning to FIG. 3 the on/off valve 61 is connected to a flow stop valve 75. The flow stop valve 75 is connected to receive the pressurized water from the on/off valve 61 and is connected to a flexible tubing 77 directed to the dispensing tube 60. The flow stop valve 75 is not intended to turn on or turn off the supply of pressurized water to a dispensing tube; rather, the flow stop valve 75 is intended to apply momentary negative or positive pressure to the flexible tube connected to the dispensing tube 60 for purposes to be described later.

Figure 4:
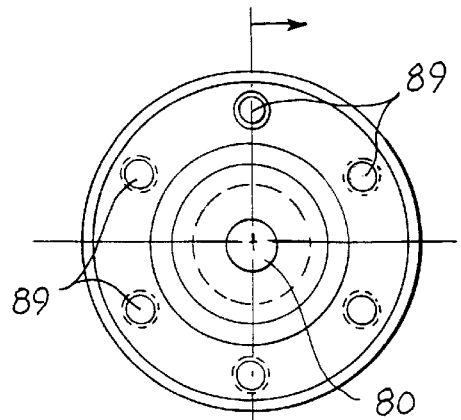
FIG. 4 is a top view of the flow stop valve of the control valve assembly of FIG. 3.
Figure 5:
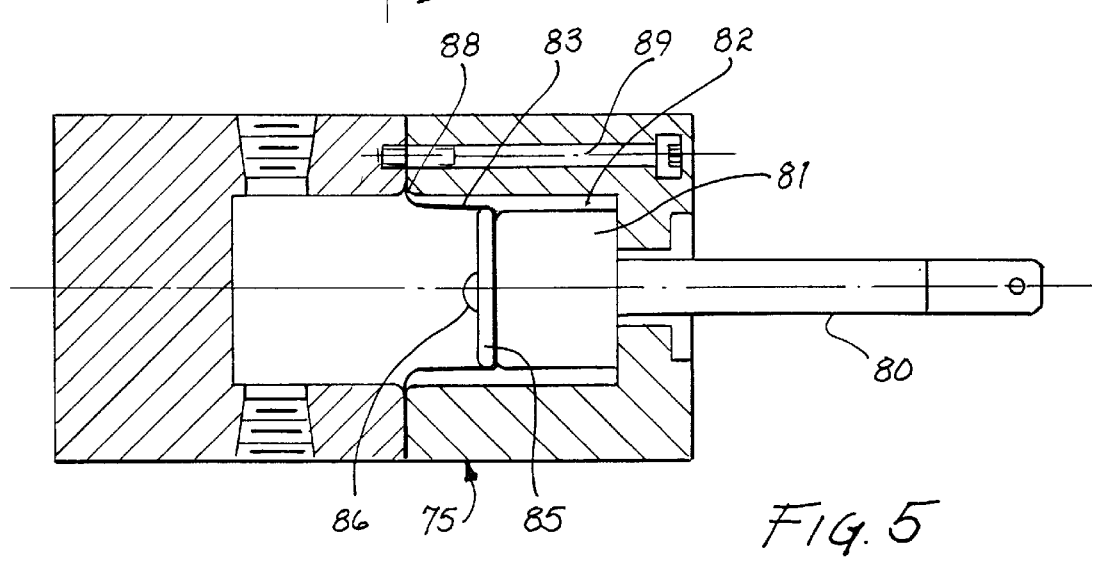
FIG. 5 is a cross-sectional view of the flow stop valve of FIG. 4 taken along line 5—5.

The flow stop valve is shown in greater detail in FIGS. 4 and 5. Referring to those figures, it may be seen that an actuating rod 80 extends vertically from the valve and is connected to a piston 81 contained within a cylindrical opening 82 in the valve housing. The piston is shown in its uppermost position wherein a rolling diaphragm 83 abuts the piston surface and is secured thereto through the utilization of a retainer plate 85 and a retainer screw 86. The rolling diaphragm is formed of a molded laminate having a fabric reinforcement imbedded in a flexible rubber food grade material. The base of the rolling diaphragm 88 is clamped between two halves of the valve which in turn are secured in place through the utilization of cap screws 89. The piston 81 may be moved vertically (as illustrated in FIGS. 3 and 8) to decrease the volume of the space beneath the diaphragm; when the piston has been lowered, and subsequently raised, the increase in volume of the space creates a brief negative-going pressure within the space and thus within the flexible tube carrying water to the dispensing tube. Raising and lowering of the piston 81 increase or decreases respectively the volume 87 in the valve and thus momentarily lowers or raises respectively the pressure of the water therein. The operation of this flow stop valve and its effect on the operation of the dispensing tube will be described more fully hereinafter.

Returning to FIGS. 3 and 8, the control valve assembly 55 with its flow stop valve 75 and on/off valve 61 includes a base plate 90 to which the flow stop valve 75 and on/off valve 61 are mounted and a hinged foot plate 92 that may be pivoted generally in a direction indicated by the arrow 93. The foot plate is connected to the actuating rod 80 of the flow stop valve and also incorporates an actuating pin 95 for contacting the operating rod 72 of the on/off valve 61. A foot plate return spring 96 is also mounted between the operating rod 72 of the on/off valve and the actuating pin 95 of the foot plate. This plate return spring forces the foot plate 92 to the position shown in FIGS. 3 and 8 thus causing the flow stop valve to assume the position shown. In the embodiment chosen for illustration, the foot plate is shown constructed in a manner convenient to be utilized by an operator with their foot; similarly, the control valve assembly could be operated by other means such as by leg operation or body motion or other motion under the control of the operator; for example, it is possible for the operator to operate the control valve assembly remotely. However, any such remote control must be responsive to the operator's input motion or pressure to be acceptable.

The control valve assembly is connected to a dispensing tube 60 through the flexible tubing 77. The dispensing tube may be seen by reference to FIG. 7 wherein it may be seen that the flexible tube 77 is connected to the dispensing tube 60 through the utilization of a quick disconnect fitting 100. The dispensing tube comprises a high density polyethylene cylindrical tube having a relatively rigid wall 102 with one open end 103 and a closed end 104. The closed end is provided with a small exit opening 105 to communicate to a tip adapter 106. The tip adapter incorporates a threaded fitting to permit standard locking rings 107 and a pastry decorating tip 108 to be secured thereto. Locking rings and decorating tips are well known in the industry, are frequently used with some pastry bags, and need not be described here. The dispensing tube 60 is provided with a piston 110 contained therein having an O-ring seal 112 and which incorporates a centralized opening 113 therein. The opening is threaded to permit an air vent coupling body 115 to be secured thereto. The coupling body 115 is one half of a quick disconnect coupling that incorporates a closed passageway therethrough that is opened whenever a mating coupling insert is inserted therein. Coupling release button 116 permits any coupling insert to be removed. The dispensing tube includes a top seal comprising a closure or cover 120 having an O-ring 121 therein and held in place with a cap 122 threadedly engaging a tube holder 123. The cover 120 is provided with a threaded centralized opening 126 which accepts a coupling body 127; the coupling body 127 forms one half of a quick disconnect coupling, the other half provided by a coupling insert 130 having a ninety degree elbow incorporated therein. The coupling body 127 includes release button 128 to permit the coupling insert 130 to be removed therefrom.

The dispensing tube is filled with the decorating or filling material, such as frosting, within the volume shown in FIG. 7 at A. Water is directed to the volume indicated in FIG. 7 at B wherein it may be seen that when the water in compartment B is under pressure, the piston is forced to the right, thereby forcing the material within the volume A out of the decorating tip. When the dispensing tube is filled with frosting or other dispensable material, it is advantageous to eliminate as much of the air within such material prior to operation. The purging of air from the dispensing material provides a smooth uninterrupted operation of the decorating process. To purge the air, the coupling body 115 provided in the piston is actually one half of a conventional quick disconnect coupling. In practice, when the dispensing tube is filled with the desired material, and the piston is placed on top of that material, a coupling insert (not shown) is inserted in the coupling body 115 to thereby automatically open an air passageway through the piston, the piston is then forced downwardly against the material within the dispensing tube to expel any air or bubbles contained in the material. When this procedure has been completed, the coupling insert is removed and the coupling body 115, which incorporates an automatic closure when the coupling insert is removed, is then air-tight and further movement of the piston into the dispensing tube will result in expelling of the material. Similarly, when the dispensing tube is first filled with the dispensing material, the compartment B is filled with water to overflowing to ensure that no air bubbles are contained within that compartment. The flexible tubing having the quick disconnect coupling insert 130 attached thereto is then coupled to the coupling body 127 to provide communication from the flexible tube to compartment B. The coupling bodies and coupling inserts described above are commercially available quick disconnect couplings and may be obtained from a variety of sources; CPC™ couplings from Colder Products Company, St. Paul, Minn., are suitable for use in the system of the present invention.

Flexible tubing used in the system of the present invention may be any light-weight tubing currently available in the tubing industry and should be non-toxic, odorless and tasteless. The tubing should be clear and have appropriate properties, such as good wetting properties, to facilitate draining and permit flush cleaning. Such flexible tubing may be available through a variety of sources and may be such tubing as Tygon® Food and Beverage Grade tubing. The semi-rigid tubing that may be utilized within the water supply cabinet is also odorless, tasteless and is translucent and is made of Food Grade polyethylene. Such tubing is compatible for use with compression fittings such as Swagelok® or Hoke Gyrolok® or push-in fittings such as Speedfit®.

In operation, the supply valve 33 to the water supply cabinet 10 is turned on and pressure from the water supply is pressure regulated and applied through the water supply cabinet filter 46. The filtered and pressure regulated water is then applied through the system maintenance manifold to the distribution manifold 52 and thence to the respective control valve assemblies. The control valve assemblies are positioned conveniently to the pastry chefs or operators. In large organizations, it is possible that these control valve assemblies can be positioned at work tables or work stations that are positioned in accordance with the requirements of the materials being decorated. For example, a cake decorating station would be located remote from a similar station organized primarily for the decoration of smaller pastries such as cookies or the filling of pastries with plain or colored confectioning material. The individual decorator chef will either fill a dispensing tube or tubes with the appropriate decorating material, or simply will avail himself of a filled dispensing tube from a rack or supply of such tubes having an assortment of decorating or filling materials therein. This selected dispensing tube is connected through the quick disconnect at the end of a flexible tube and the operator then operates the corresponding control valve assembly by depressing a foot plate to thereby open the on/off valve connected thereto. Water pressure from the flexible tube admitted to the dispensing tube forces the piston therein against the decorating material contained within the tube which in turn exits the dispensing tube through a selected decorator tip. As the decoration of the workpiece continues, the flow from the decorator tip may be discontinued by the operator by simply releasing the foot plate causing the on/off valve to close and also causing the withdrawal of the piston within the flow stop valve to a position such as shown in FIG. 5. The withdrawal of this piston upwardly as shown in FIG. 5 will result in a brief negative going pressure on the water supplied to the corresponding dispensing tube as a result of the lifting of the rolling diaphragm within the flow stop valve. This brief negative going pressure will immediately relieve pressure at the decorating tip of the dispensing tube and prevent the material in the tube from dripping or continuing to exit once the foot plate has been released. When the operator becomes used to the utilization of the foot pedal, it is possible to regulate the speed and the amount of material exiting the decorating tip by regulating the pressure applied to the foot pedal. Depression of the foot pedal causes the corresponding depression of the piston within the flow stop valve which provides an immediate positive going pressure in excess of the pressure then existent in the dispensing tube which, in turn, causes the immediate flow of material from the decorating tip. The operator therefore has fine control over the material exiting from the corresponding decorating tip. When the design being implemented by the operator requires a different color, or perhaps a different type of decorating material, the dispensing tube is merely disconnected through removal of the flexible tubing therefrom at the quick disconnect, and a new dispensing tube is selected having the appropriate material, color, etc. The new dispensing tube is then quickly connected to the flexible tubing and the decorating operation continued with the newly selected material.

The present invention has been described in terms of a selected specific embodiment incorporating details to facilitate the understanding of the principles of construction and operation of the invention. Such reference herein to a specific embodiment and details thereof is not intended to limit the scope of the claims appended hereto. It will be apparent to those skilled in the art that modifications may be made in the embodiment chosen for illustration without departing from the spirit and scope of the invention.

What is claimed is:

1. A dispensing system for decorating or filling edible products and for connection to a source of water under pressure comprising:
   (a) a water pressure regulator connected to receive water from said source and deliver water at a regulated reduced pressure;
   (b) an on/off water valve actuatable by an operator connected to said water pressure regulator;
   (c) flexible tube connected at one end thereof to said water valve to receive water under pressure therefrom;
   (d) a dispensing tube connected to an opposite end of said flexible tube to receive water under pressure therefrom when said on/off water valve is on;
   (e) said dispensing tube having:
      i. a quick disconnect connector at one end thereof for connection to said flexible tube;
      ii. a hollow cylindrical body;
      iii. a piston in said body forming a first chamber on one side thereof for containing decorating material to be dispensed and a second chamber on another side thereof in communication with said flexible tube to receive water under pressure;
      iv. means defining an exit opening in said first chamber for permitting
   the flow of decorating material therefrom;
   whereby, operation of said on/off valve by the operator causes water under pressure to be admitted to said second chamber to force said piston against said decorating material in said first chamber resulting in the dispensing of said material through said exit opening onto or into an edible product.

2. The combination set forth in claim 1 wherein said exit opening includes removable and replaceable decorating tips to permit a selection of decorating tips by said operator.

3. The combination set forth in claim 1 wherein said on/off valve is spring biased to an off position and is moveable by said operator to an on position while said operator supports said dispensing tube.

4. A dispensing system for decorating or filling edible products and for connection to a source of water under pressure comprising:
   (a) an on/off water valve actuatable by an operator connected to a source of water;
   (b) a flow stop valve having:
      i. an inlet connected to receive water under pressure from said on/off valve when the latter is on;
      ii. an outlet;
      iii. a variable volume valve body between said inlet and said outlet;
      iv. a piston in contact with a rolling diaphragm, said piston connected to said diaphragm to force said diaphragm into and out of said variable volume in said valve body to increase and decrease said volume and temporarily decrease and increase the pressure respectively of said water;
   (c) a flexible tube connected at one end thereof to the outlet of said flow stop valve;
   (d) a dispensing tube connected to an opposite end of said flexible tube to receive water under pressure therefrom when said on/off water valve is on;
   (e) said dispensing tube having:
      i. a quick disconnect connector at one end thereof for connection to said flexible tube;
      ii. a hollow cylindrical body;
      iii. a piston in said body forming a first chamber on one side thereof for containing decorating material to be dispensed and a second chamber on another side thereof in communication with said flexible tube to receive water under pressure;
      iv. means defining an exit opening in said first chamber for permitting the flow of decorating material therefrom;
   whereby, operation of said on/off valve by the operator causes water under pressure to be admitted to said second chamber to force said piston against said decorating material in said first chamber resulting in the dispensing of said material through said exit opening onto an edible product.

5. The combination set forth in claim 4 wherein said exit opening includes removable and replaceable decorating tips to permit a selection of decorating tips by said operator.

6. The combination set forth in claim 4 wherein said on/off valve is spring biased to an off position and is moveable by said operator to an on position while said operator supports said dispensing tube.

7. The combination set forth in claim 4 wherein said on/off valve and said flow stop valve are mechanically connected to operate simultaneously.

8. A dispensing system for decorating or filling edible products and for connection to a source of water under pressure comprising:

(a) a water pressure regulator connected to receive water from said source and deliver water at a regulated reduced pressure;

(b) a filter connected to said regulator to receive water at said regulated reduced pressure;

(c) an on/off water valve actuatable by an operator connected to said filter to receive regulated reduced pressure filtered water;

(d) a flexible tube connected at one end thereof to said on/off water valve to receive water under pressure therefrom;

(e) a dispensing tube connected to an opposite end of said flexible tube to receive water under pressure therefrom when said on/off water valve is on;

(f) said dispensing tube having:
  i. a quick disconnect connector at one end thereof for connection to said flexible tube;
  ii. a hollow cylindrical body;
  iii. a piston in said body forming a first chamber on one side thereof for containing decorating material to be dispensed and a second chamber on another side thereof in communication with said flexible tube to receive water under pressure;
  iv. means defining an exit opening in said first chamber for permitting the flow of decorating material therefrom;

whereby, operation of said on/off valve by the operator causes water under pressure to be admitted to said second chamber to force said piston against said decorating material in said first chamber resulting in the dispensing of said material through said exit opening onto an edible product.

9. The combination set forth in claim 8 wherein said exit opening includes removable and replaceable decorating tips to permit a selection of decorating tips by said operator.

10. The combination set forth in claim 8 wherein said on/off valve is spring biased to an off position and is moveable by said operator to an on position while said operator supports said dispensing tube.

11. A dispensing system for decorating or filling edible products and for connection to a source of water under pressure comprising:

(a) a water pressure regulator connected to receive water from said source and deliver water at a regulated reduced pressure;

(b) a filter connected to said regulator to receive water at said regulated reduced pressure;

(c) an on/off water valve actuatable by an operator connected to said filter to receive regulated reduced pressure filtered water;

(d) a flow stop valve having:
  i. an inlet connected to receive water under pressure from said on/off valve when the latter is on;
  ii. an outlet;
  iii. a variable volume valve body between said inlet and said outlet;
  iv. a piston in contact with a rolling diaphragm, said piston connected to said diaphragm to force said diaphragm into and out of said variable volume in said valve body to increase and decrease said volume and temporarily decrease and increase the pressure respectively of said water;

(e) a flexible tube connected at one end thereof to the outlet of said flow stop valve;

(f) a dispensing tube connected to an opposite end of said flexible tube to receive water under pressure therefrom when said on/off water valve is on;

(g) said dispensing tube having:
  i. a quick disconnect connector at one end thereof for connection to said flexible tube;
  ii. a hollow cylindrical body;
  iii. a piston in said body forming a first chamber on one side thereof for containing decorating material to be dispensed and a second chamber on another side thereof in communication with said flexible tube to receive water under pressure;
  iv. means defining an exit opening in said first chamber for permitting the flow of decorating material therefrom;

whereby, operation of said on/off valve by the operator causes water under pressure to be admitted to said second chamber to force said piston against said decorating material in said first chamber resulting in the dispensing of said material through said exit opening onto an edible product.

12. The combination set forth in claim 11 wherein said exit opening includes removable and replaceable decorating tips to permit a selection of decorating tips by said operator.

13. The combination set forth in claim 11 wherein said on/off valve is spring biased to an off position is moveable by said operator to an on position while said operator supports said dispensing tube.

14. The combination set forth in claim 11 wherein said on/off valve and said flow stop valve are mechanically connected to operate simultaneously.

\* \* \* \* \*